(12) United States Patent
Smirnov et al.

(10) Patent No.: US 8,352,976 B2
(45) Date of Patent: Jan. 8, 2013

(54) DISC CHUCKING APPARATUS, MOTOR AND DISC DRIVING DEVICE EQUIPPED WITH MOTOR

(75) Inventors: Viatcheslav Smirnov, Gyunggi-do (KR); Chang Keun Jun, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 12 days.

(21) Appl. No.: 13/075,938

(22) Filed: Mar. 30, 2011

(65) Prior Publication Data

US 2012/0180078 A1 Jul. 12, 2012

(30) Foreign Application Priority Data

Jan. 6, 2011 (KR) .................. 10-2011-0001189

(51) Int. Cl.
*G11B 17/028* (2006.01)
(52) U.S. Cl. .................... 720/707; 720/696; 720/712
(58) Field of Classification Search .................. 720/695, 720/703–714
See application file for complete search history.

(56) References Cited

U.S. PATENT DOCUMENTS

| | | | | |
|---|---|---|---|---|
| 6,993,779 | B2* | 1/2006 | Horng et al. | 720/695 |
| 2005/0022223 | A1* | 1/2005 | Hsu et al. | 720/709 |
| 2006/0031866 | A1 | 2/2006 | Kim et al. | |
| 2006/0031867 | A1 | 2/2006 | Ikemoto | |
| 2006/0048176 | A1 | 3/2006 | Choi et al. | |
| 2008/0059984 | A1 | 3/2008 | Kanzawa et al. | |

FOREIGN PATENT DOCUMENTS

JP   10-092097   4/1998

* cited by examiner

*Primary Examiner* — Nathan Danielsen
(74) *Attorney, Agent, or Firm* — McDermott Will & Emery LLP

(57) ABSTRACT

The present invention relates to a disc chucking apparatus having claws that horizontally move and provide elasticity to improve performance in centering and chucking a disc. The disc chucking apparatus includes: a centering base to which an inner circumferential surface of a disc is fixed; a plurality of chuck chips arranged at regular intervals along an outer circumferential surface of the centering base; and a plurality of elastic support parts disposed to be opposite to the chuck chips on the centering base, rotating horizontally when the disc is mounted, and pressing the inner circumferential surface of the disc in an outer diameter direction thereof.

16 Claims, 6 Drawing Sheets

DISC CHUCKING APPARATUS, MOTOR AND DISC DRIVING DEVICE EQUIPPED WITH MOTOR

CROSS-REFERENCE TO RELATED APPLICATIONS

This application claims the priority of Korean Patent Application No. 10-2011-0001189 filed on Jan. 6, 2011, in the Korean Intellectual Property Office, the disclosure of which is incorporated herein by reference.

BACKGROUND OF THE INVENTION

1. Field of the Invention

The present invention relates to a disc chucking apparatus having an improved claw structure to improve performance in centering and chucking a disc, a motor, and a disc driving device equipped with the motor.

2. Description of the Related Art

In general, a spindle motor disposed in a disc driving device rotates a disc to allow an optical pickup unit to read data recorded on the disc.

The disc is placed on and fixed to a disc chucking apparatus of the spindle motor and rotated with the rotation of the motor.

In this configuration, the inner circumferential surface of the disc is fitted over the outer circumferential surface of a centering base of the disc chucking apparatus, in which the center of the disc should be aligned with the center of the centering base in order to ensure the reliability of the disc in the recording or playback performance thereof.

The related art disc chucking apparatus has a plurality of chuck chips and claws to prevent a disc, fitted over the outer circumferential surface of the centering base, from being separated from the centering base while the motor operates.

The claws provide elasticity to the inner circumferential surface of the disc fixed to the centering base.

In the related art, the claws are fixed to the top of the centering base and provides electricity to the disc through protrusions protruding downwardly. However, in the structure of the claws according to the related art, the protrusions are pushed in the inner diameter direction of the disc when the disc is placed, such that the inner surface of the disc and the outer surfaces of the claws may not be in close contact.

Due to the structure of the claws in the related art, the elasticity of the claws is not transmitted horizontally to the disc, but rather to the upper portion of the disc. Therefore, the disc is likely to fluctuate while rotating, and this may become worse in the case of high density discs (e.g. Blu-ray discs).

Further, since the related art claws are not firmly in contact with the disc as described above, the centers of the disc and the centering base are not aligned when the motor operates, such that the performance of the disc in the recording or playback thereof is reduced.

SUMMARY OF THE INVENTION

An aspect of the present invention provides a disc chucking apparatus having claws that horizontally move and provide elasticity so as to improve performance in centering and chucking a disc.

Another aspect of the present invention provides a motor including the disc chucking apparatus.

Another aspect of the present invention provides a disc driving device having the motor equipped therein.

According to an aspect of the present invention, there is provided a disc chucking apparatus including: a centering base to which an inner circumferential surface of a disc is fixed; a plurality of chuck chips arranged at regular intervals along an outer circumferential surface of the centering base; and a plurality of elastic support parts disposed to be opposite to the chuck chips on the centering base, rotating horizontally when the disc is mounted, and pressing the inner circumferential surface of the disc in an outer diameter direction thereof.

The elastic support parts may be disposed within support indentations formed in the outer circumferential surface of the centering base.

Each of the elastic support parts may include a frame protruding from the centering base in the outer diameter direction; an elastic portion extending from the frame along an outer circumference of the centering base; and a claw formed at an end of the elastic portion to be in contact with the inner circumferential surface of the disc.

A circle formed by connecting ends of the frames of the elastic support parts may correspond to the outer circumference of the centering base.

The frame may have a lower surface extended horizontally from a lower surface of the centering base.

The frame may have a lower surface disposed on a plane different to that of a lower surface of the centering base.

The elastic portion may protrude bidirectionally from the frame along the outer circumference of the centering base.

The elastic portion may have a lower surface extended horizontally from a lower surface of the frame.

The elastic portion may have a lower surface disposed on a plane different to that of a lower surface of the frame.

The claw may be formed at ends of the elastic portion protruding bidirectionally from the frame.

The claw may have a protrusion protruding from an outer surface thereof opposite to the inner circumferential surface of the disc and contacting the inner circumferential surface of the disc.

A diameter of a circle formed by connecting contact surfaces between the claws and the inner circumferential surface of the disc may be larger than a diameter of the centering base.

The claw may have an inclined surface at an upper portion of an outer surface thereof opposite to the inner circumferential surface of the disc.

A diameter of a circle formed by connecting the uppermost ends of the inclined surfaces of the claws may be smaller than a diameter of the centering base.

The disc chucking apparatus may further include a support plate protruding from each of the elastic support parts in the outer diameter direction and having an upper surface in surface contact with a lower surface of the disc.

According to another aspect of the present invention, there is provided a motor including: the disc chucking apparatus as described above; a rotor having the disc chucking apparatus mounted thereon; and a stator rotating the rotor by electromagnetic coupling.

According to another aspect of the present invention, there is provided a disc driving device including: a motor having the disc chucking apparatus as described above; an optical pickup unit optically recording or playing the disc; and a moving unit moving the optical pickup unit in a diameter direction of the disc.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
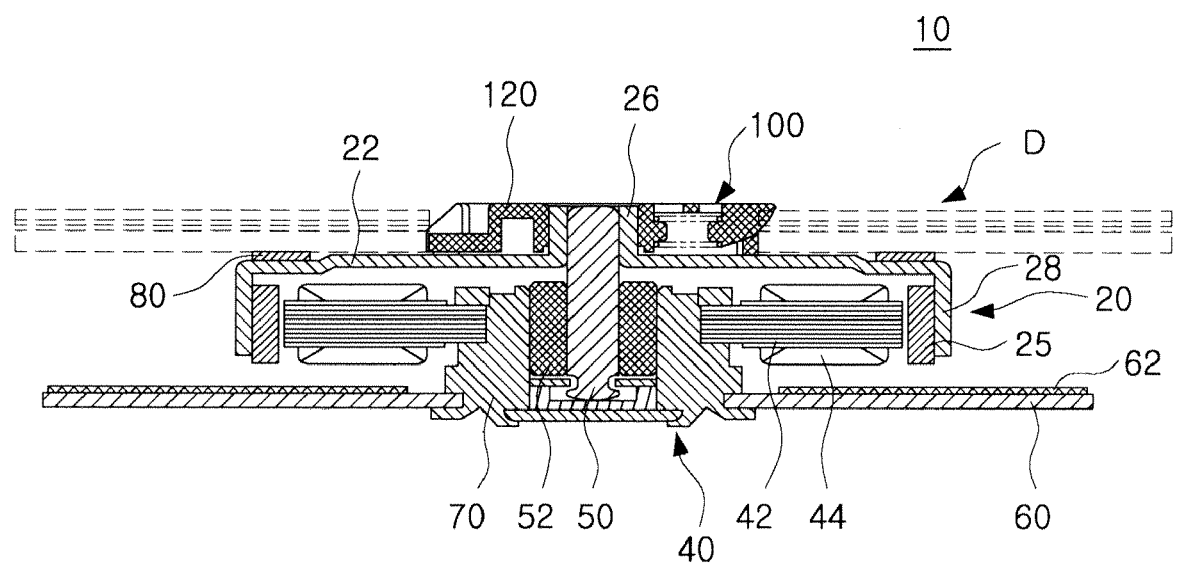
FIG. 1 is a schematic cross-sectional view showing a motor according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the same reference numerals will be used to designate the same or like components.

Meanwhile, terms used herein associated with directions will now be defined. As viewed in FIG. 1, the axial direction refers to a vertical direction on the basis of a shaft 50 in FIG. 1 and an outer diameter direction or an inner diameter direction refers to a direction towards the outer edge of a rotor 20 on the basis of the shaft 50 or a direction towards the center of the shaft 50 on the basis of the outer edge of the rotor 20.

FIG. 1 is a schematic cross-sectional view showing a motor according to an embodiment of the present invention.

Referring to FIG. 1, a motor 10 according to an embodiment of the present invention may be a spindle motor that is used for an optical disc drive rotating a disc D, and may include the rotor 20 and a stator 40.

The rotor 20 includes a cup-shaped rotor case 22 having a ring-shaped magnet 25, corresponding to a coil 44 of the stator 40, on the inner circumferential surface thereof. The magnet 25 is a permanent magnet having N- and S-poles alternately magnetized in a circumferential direction to thereby generate a predetermined magnitude of magnetic force.

The rotor case 22 includes a rotor hub 26 press-fitted and coupled to the shaft 50 and a magnet seat 28 having the ring-shaped magnet 25 on the inner circumferential surface thereof . The rotor hub 26 is bent upwardly in the axial direction to be coupled with the shaft 50, and a disc chucking apparatus 100 is mounted on the outer circumferential surface of the rotor hub 26 to mount the disc D.

Further, a disc support 80 may be mounted on the upper surface of the rotor case 22 such that the disc support 80 supports the lower surface of the disc D to prevent the disc D from sliding during the rotations of the disc. The disc support 80 may be formed in a circular ring and may be made of rubber to provide a frictional force when contacting the lower surface of the disc D.

The stator 40 implies all fixed members, except for the rotating members, and rotates the rotor 20 by electromagnetic coupling with the magnet 25 of the rotor 20. In order to achieve this configuration, the stator 40 may include a base plate 60 having a circuit board 62 installed thereon, a sleeve 52 supporting the shaft 50, a sleeve holder 70 fixedly coupling the sleeve 52 with the base plate 60, a core 42 fixed to the sleeve holder 70 and coils 44 wound around the core 42.

In the motor 10 according to this embodiment, the magnet 25 is opposite to the coils 44 and the rotor 20 is rotated by electromagnetic interaction between the magnet 25 and the coils 44. Herein, the disc chucking apparatus 100 fastened to the upper surface of the rotor case 22 is also rotated by the rotation of the rotor case 22.

The disc chucking apparatus 100 of the motor 10 according to this embodiment has an elastic support part 200 that horizontally moves and supports the disc D. Hereafter, the disc chucking apparatus 100 according to this embodiment will be described in more detail.

Figure 2:
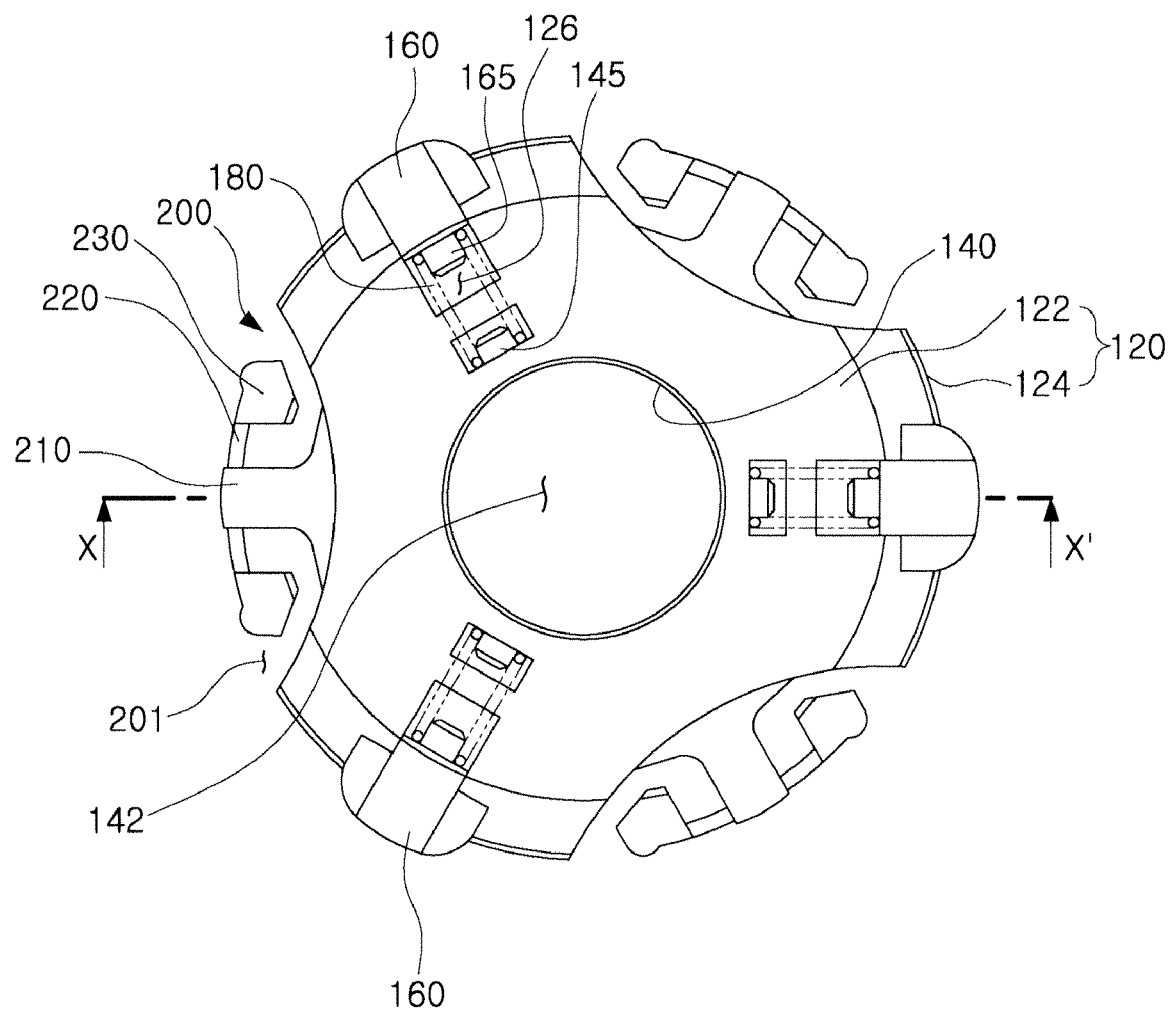
FIGS. 2 and 3 are plan views of a disc chucking apparatus according to an embodiment of the present invention.
Figure 3:
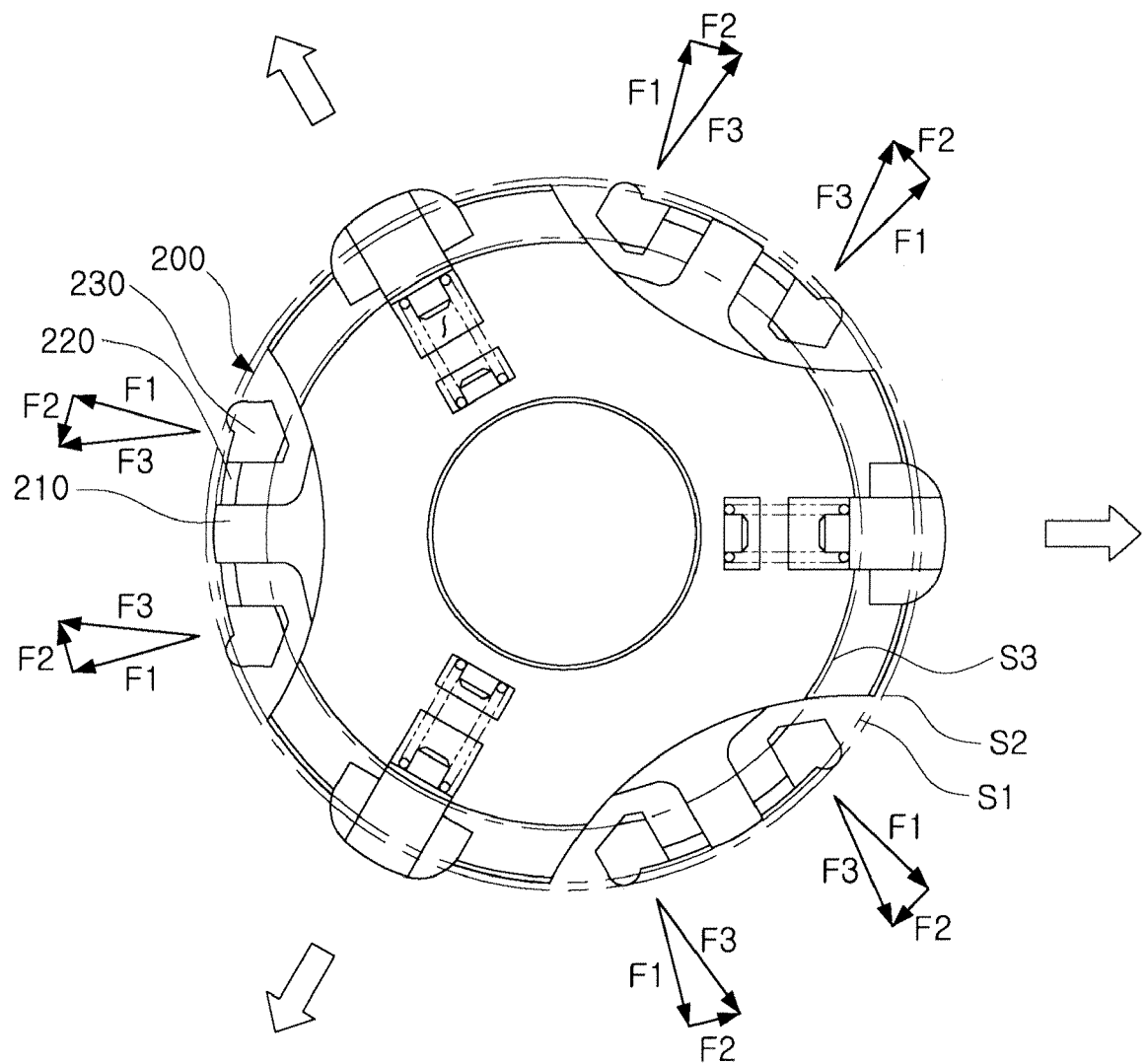
Figure 4:
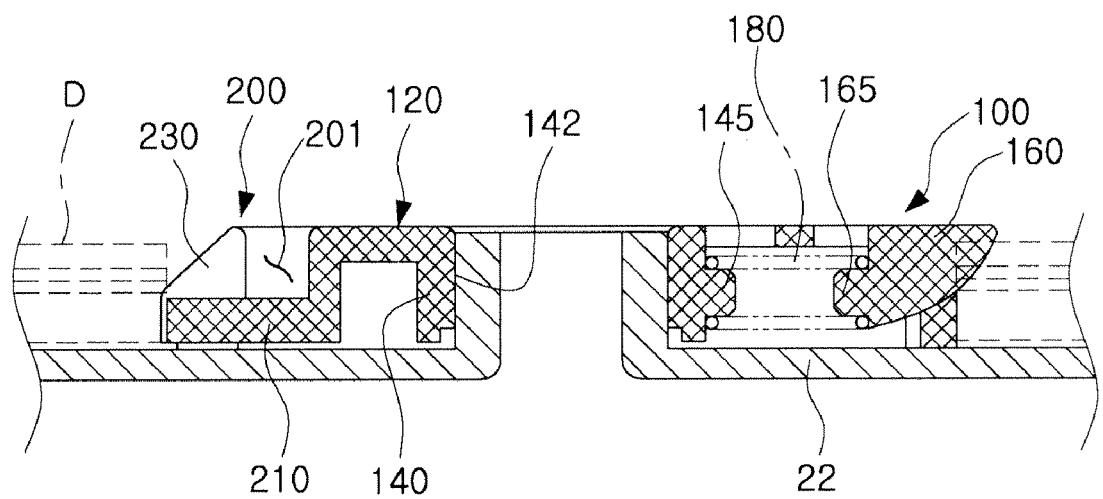
FIG. 4 is a cross-sectional view taken along line X-X' of FIG. 2.
Figure 5:
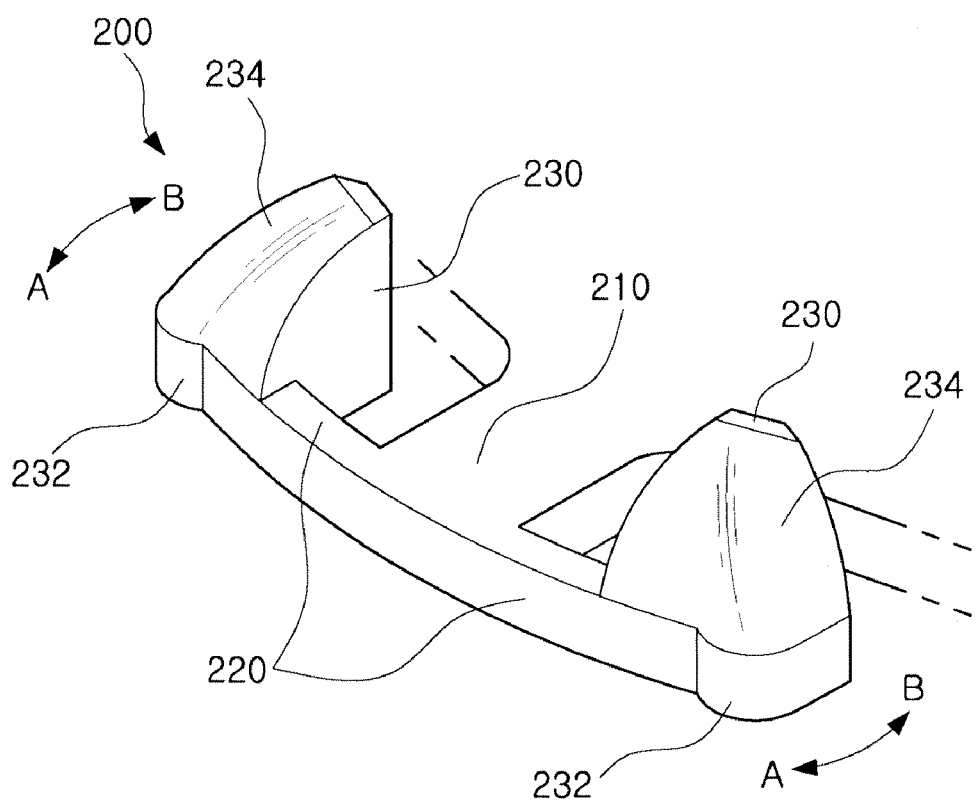
FIG. 5 is a partial perspective view showing an elastic support part according to an embodiment of the present invention.

FIGS. 2 and 3 are plan views of a disc chucking apparatus according to an embodiment of the present invention. Further, FIG. 4 is a cross-sectional view taken along line X-X' of FIG. 2, and FIG. 5 is a partial perspective view showing an elastic support part according to an embodiment of the present invention.

Referring to FIGS. 2 to 5, the disc chucking apparatus 100 may include a centering base 120, chuck chips 160, and elastic support parts 200.

The centering base 120 is disposed above the rotor case 22 in the axial direction and may have a circular flat plate 122 forming the upper surface thereof, an outer circumferential portion 124 extending downwardly from the outer edge of the flat plate 122 in the axial direction, and a guide boss 140.

In this configuration, the guide boss 140 is formed at the center of the centering base 120 and extends downwardly from the center of the flat plate 122 in the axial direction. Further, a boss hole 142, which is a through-hole having a cylindrical shape, is formed within the guide boss 140, and the rotor hub 26 of the rotor case 22 is fixedly inserted into the boss hole 142.

Further, the centering base 120 has a plurality of chuck chip receiving portions 126 and the elastic support parts 200 along the outer circumference thereof.

The chuck chip receiving portions 126 are a plurality of grooves formed along the outer circumferential surface of the centering base 120 and used as spaces receiving the chuck chips 160 to be described below.

The chuck chips 160 received in the chuck chip receiving portions 126 are provided to prevent the disc D mounted on the disc chucking apparatus 100 from being separated from the disc chucking apparatus 100 due to a rotational force when the motor 10 operates.

The chuck chips 160 are partially received in the chuck chip receiving portions 126 of the centering base 120 to be coupled with the centering base 120. In this configuration, one end of each of the chuck chips 160 protrudes outwardly from the centering base 120 and presses the disc D fitted to the outer circumferential surface of the centering base 120 in the outer diameter direction and downwardly in the axial direction.

The chuck chips 160 elastically press the disc D. To enable this, elastic members 180 applying elastic force to the chuck chips 160 are disposed between the chuck chips 160 and the guide boss 140. Further, fixing protrusions 145 and 165 may be formed on the outer surfaces of the chuck chips 160 and the guide boss 140, respectively, in order to fix one end of the elastic member 180.

A plurality of elastic support parts 200 are arranged along the outer circumference of the centering base 120. In more detail, the elastic support parts 200 are arranged to be opposite to the chuck chips 160 along the outer circumference of the centering base 120 to assist the chuck chips 160 to prevent the disc D from being separated from the disc chucking apparatus 100, when the disc D is mounted.

In this embodiment, the disc chucking apparatus 100 with three chuck chips disposed at regular intervals on the centering base 120 is exemplified.

Therefore, the three elastic support parts 200 according to this embodiment are provided corresponding to the arrangement of the chuck chips 160, the same number as that of the chuck chips 160. Accordingly, the elastic support parts 200 and the chuck chips 160 are alternately arranged along the outer circumference of the centering base 120. However, the elastic support parts 200 according to the present invention are not limited thereto and may be modified in various manners in accordance with the number and arrangement of the chuck chips 160.

The elastic support parts 200 are formed within support indentations 201 formed in the outer circumferential surface of the centering base 120 and may each include a frame 210, an elastic portion 220, and a claw 230.

The frame 210 protrudes from the support indentation 201 of the centering base 120 in the outer diameter direction. In this structure, as shown in FIG. 3, a circle S1 formed by connecting the ends of the frames 210 may have the same diameter as the outer circumference of the centering base 120.

Further, the frame 210 according to this embodiment protrudes horizontally along the lower surface of the centering base 120.

The elastic portion 220 extends bidirectionally from the frame 210 along the outer circumference of the centering base 120. Therefore, the elastic portion 220, similar to the frame 210, protrudes along the lower surface of the centering base 120.

Further, the elastic portion 220 according to this embodiment extends from the frame 210 while having a corresponding shape along the outer circumference of the centering base 120. Therefore, in the case in which one end of the elastic portion 220 connected to the frame 210 is a center of rotation, the elastic portion 220 can elastically move in directions A and B of FIG. 5.

The claws 230 are formed at both ends of the elastic portion 220.

The claws 230 are coupled to the other ends of the elastic portions 220 and press the disc D in the outer diameter direction while being in direct contact with the inner circumferential surface of the disc D mounted on the disc chucking apparatus 100.

For this configuration, the claws 230 according to this embodiment may have at least one or more protrusions 232 on the outer surface thereof opposite to the inner circumferential surface of the disc.

The protrusions 232 directly contact the inner circumferential surface of the disc D. Meanwhile, in the case in which the disc D is accurately mounted on the disc chucking apparatus 100 according to this embodiment, the inner circumferential surface of the disc D is not in contact with the centering base 120, but in direct contact with the protrusions 232 of the elastic support parts 200 and the chuck chips 160.

Therefore, as shown in FIG. 3, the diameter of the circle S2 formed by connecting the contact surfaces between the protrusions 232 and the inner circumferential surface of the disc D is larger than the diameter of a circle (e.g. S1) formed by the outer circumference of the centering base 120.

Further, the outer surfaces of the claws 230 according to this embodiment may be inclined surfaces 234 at the upper portions thereof. The diameter of a circle S3 formed by connecting the uppermost ends of the inclined surfaces 234 of the claws 230 is smaller than the diameter of the circle S1 formed by the outer circumference of the centering base 120. Therefore, the upper ends of the claws 230 can be easily inserted into the hole of the disc D, when the disc D is mounted on the disc chucking apparatus 100.

Further, the inclined surfaces 234 may be curved, as shown in FIG. 5. In the case in which the inclined surfaces 234 are curved, the curvature of the curved surfaces may be made differently in accordance with the height of the claws 230 in order to allow the disc D to be easily inserted.

However, the present invention is not limited thereto, and the inclined surfaces 234 may be modified in various manners, for example, they are not curved, but flat.

Meanwhile, in this embodiment, the support indentations 201 are formed in an arc shape in the outer circumferential surface of the centering base 120. However, the present invention is not limited thereto and the support indentations maybe formed in various manners, such as angular indentations or elliptical indentations.

In the elastic support parts 200 according to this embodiment, when the disc D is mounted on the disc chucking apparatus 100, the claws 230 pressed by the disc D are horizontally moved in the inner diameter direction (in the direction B of FIG. 5) by the elastic portions 220.

Therefore, the claws 230 continuously press the disc D (in the direction A of FIG. 5) in the outer diameter direction by the elastic force provided from the elastic portions 220.

In the disc chucking apparatus 100 having the configuration described above, according to this embodiment of the present invention, as shown in FIG. 3, the inner circumferential surface S1 of the disc D is pressed in three directions by the chuck chips 160 while the inner circumferential surface S1 of the disc D is pressed in six directions by the elastic support parts 200.

Since the elastic support parts 200 provide elasticity through rotations, a resultant force F3 of a pressing force F1 applied in the outer diameter direction and a pressing force F2 by rotational force is applied to the disc D.

Therefore, a large pressing force may be applied thereto, as compared with the case of the related art in which only the pressing force F1 is applied in the outer diameter direction.

Further, the elastic support parts 200 according to this embodiment support the disc D using the six claws 230. Therefore, the pressing force may be distributed in several directions and thus the disc D may be stably supported thereby, as compared with the case of the related art in which the disc D is supported by three claws 230.

Further, in the elastic support parts 200 according to this embodiment, as shown in FIG. 4, the frames 210 protrude along the lower surface of the centering base 120 in the outer diameter direction. That is, the lower surface of the frame 210 horizontally extend from the lower surface of the centering base 120. Further, as shown in FIG. 5, the lower surfaces of the claw 230 and the elastic portion 220 horizontally extend from the lower surface of the frame 210.

Therefore, when the disc D is mounted on the disc chucking apparatus 100, the elastic portions 220 support the lower portions of the claws 230, such that the inner circumferential surface of the disc may be supported by using the entirety of protruding surfaces of the protrusions 232 of the claws 230. Therefore, the disc can be stably supported as compared with the case of the related art.

Further, in the elastic support parts 200 according to this embodiment, the ends of the frames 210 are disposed on the outer circumference of the centering base 120. Therefore, when the disc D is rotated and a force larger than the pressing force from the elastic support parts 200 is applied against the pressing force to the disc D, the inner circumferential surface of the disc D is in contact with the ends of the frames, such that the disc D is supported by the frames.

As described above, since the elastic support parts 200 according to this embodiment are configured to allow the disc D to move in the minimum range during rotations, it is possible to prevent the disc D from being excessively biased.

Meanwhile, the disc chucking apparatus according to the present invention is not limited to the configuration described above, and may be modified in various manners.

A disc chucking apparatus to be described below has a configuration similar to that of the disc chucking apparatus according to the above-described embodiment, and is partially different therefrom. Therefore, a detailed description of the same components as those in the above-described embodiment will be omitted, and a difference therebetween will be primarily described.

Figure 6:
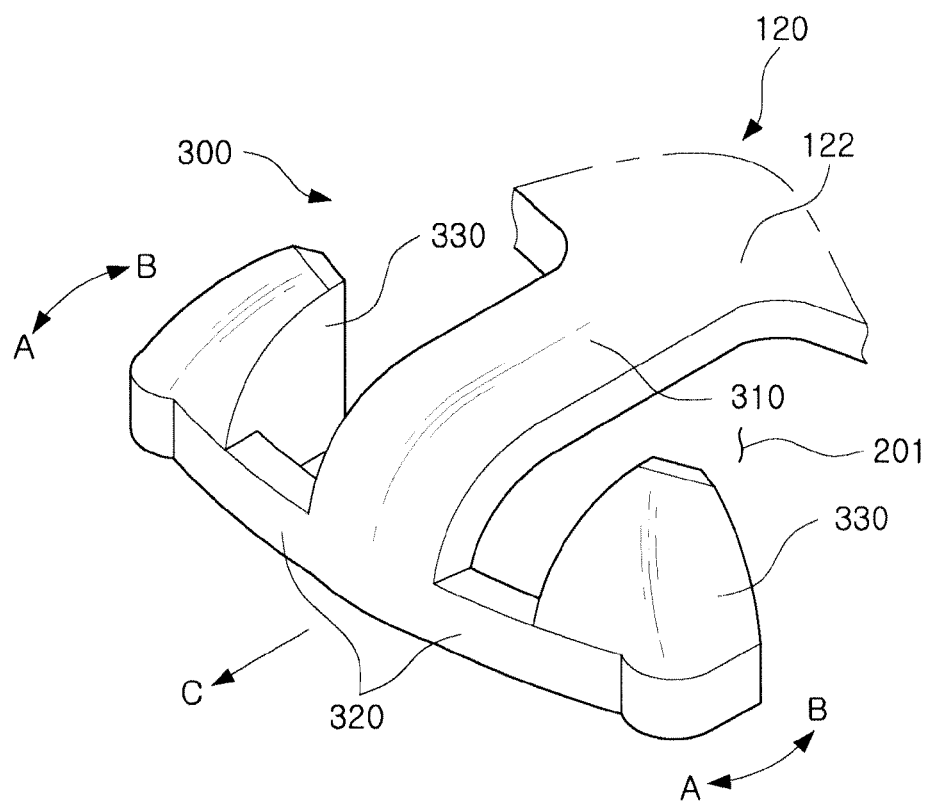
FIG. 6 is a perspective view showing an elastic support part of a disc chucking apparatus according to another embodiment of the present invention.

FIG. 6 is a perspective view showing an elastic support part of a disc chucking apparatus according to another embodiment of the present invention. FIG. 6 shows the part corresponding to that shown in FIG. 5.

Referring to FIG. 6, elastic support parts 300 according to this embodiment, as the elastic support parts 200 in the above-described embodiment, are formed within the support indentations 201 formed in the outer circumferential surface of the centering base 120 and may each include a frame 310, an elastic portion 320, and a claw 330.

The frame 310 protrudes from the support indentation 201 of the centering base 120 in the outer diameter direction.

The frame 310 protrudes from the centering base 120 while allowing the lower surface therof to be disposed on a plane different to that of the lower surface of the centering base 120.

In more detail, the frame 310 according to this embodiment extends from the upper surface of the centering base 120, that is, the flat plate 122, and the lower surface of the frame 310 is spaced apart from the lower surface of the centering base 120 (or the upper surface of the rotor case).

The lower surface of the frame 310 and the lower surface of the elastic portion 320 are disposed on different planes, due to the structure of the frame 310. However, this configuration may be modified in different manners, if needed, such as a case in which they are disposed on the same plane.

Further, according to this embodiment, the ends of the frame 310 extend downwardly in the axial direction and are connected with the elastic portion 320. Therefore, the upper surface of the end of the frame 310 which is connected with the elastic portion 320 may be curved because it may contact the inner surface of the disc when the disc is mounted. However, it is not limited thereto and may be modified in different manners, such as an inclined surface.

Meanwhile, the elastic portion 320 and the claw 330 may be formed in the same manner as the elastic portion 220 (FIG. 5) and the claw 230 (FIG. 5), and a detailed description thereof will be omitted.

In the case in which the frame 310 extends from the upper surface of the centering base, rather than the lower surface of the centering base as described above, a pressing force can be applied to the disc D mounted on the disc chucking apparatus in a direction C by the frame 310, in addition to a pressing force in a direction A by the elastic portion 320. Therefore, pressing forces may be applied to the inner circumferential surface of the disc D in several directions, and thus the disc can be stably mounted.

Figure 7:
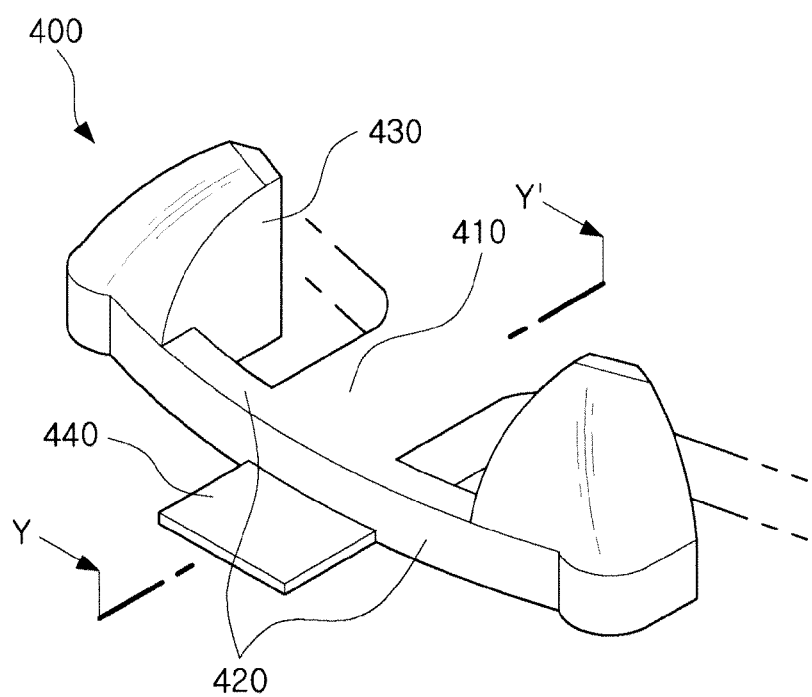
FIG. 7 is a perspective view showing an elastic support part of a disc chucking apparatus according to another embodiment of the present invention.
Figure 8:
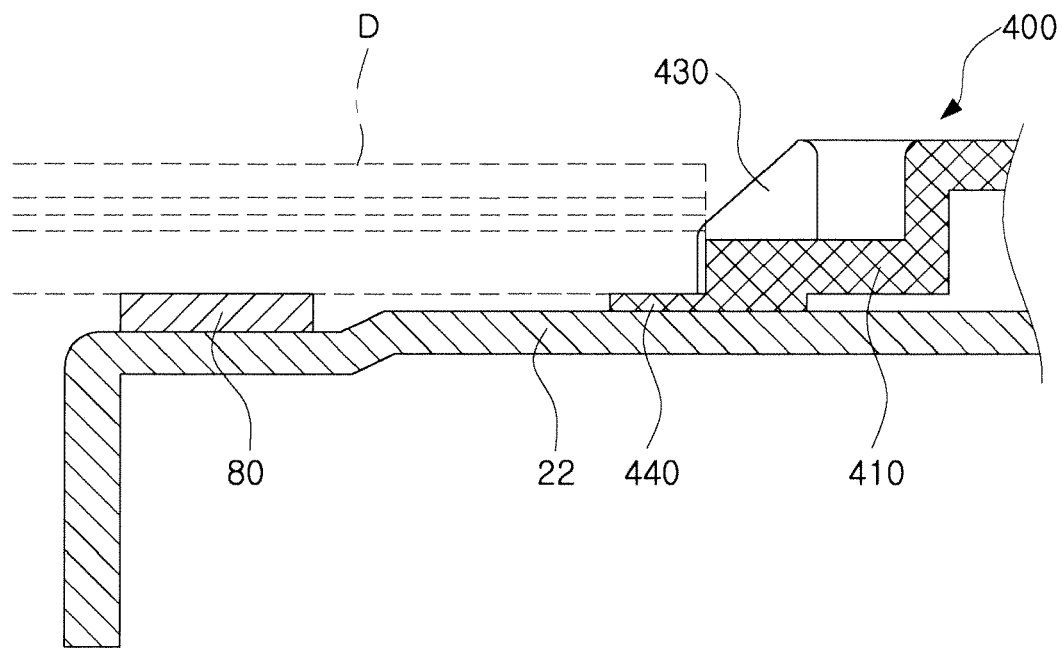
FIG. 8 is a cross-sectional view taken along line Y-Y' of FIG. 7.

FIG. 7 is a perspective view showing an electric support part of a disc chucking apparatus according to another embodiment of the present invention, and FIG. 8 is a cross-sectional view taken along line Y-Y' of FIG. 7. FIG. 7 shows the part corresponding to that shown in FIG. 5.

Referring to FIGS. 7 and 8, elastic support parts 400 according to this embodiment, as in the above-described embodiments, are formed within the support indentations 201 (FIG. 2) formed in the outer circumferential surface of the centering base 120 (FIG. 2) and may each include a frame 410, an elastic portion 420, a claw 430, and a support plate 440.

In this embodiment, the frame 410, the elastic portion 420, and the claw 430 may have the same configuration as those of the elastic support part 200 shown in FIG. 5. Therefore, a detailed description thereof will be omitted.

The support plate 440 protrudes from the edge of the frame 410 in the outer diameter direction. The support plate 440 protrudes along the lower surface of the frame 410.

Therefore, the support plate 440 is in surface contact with the rotor case 22 under the disc chucking apparatus.

Further, the support plate 440 according to this embodiment has a thickness corresponding to the thickness of the disc support 80 disposed on the rotor case 22. That is, the upper surfaces of the support plate 440 and the disc support 80 are disposed on the same plane.

Accordingly, the lower surface of the disc D that is mounted on the disc chucking apparatus is supported by the the upper surfaces of the support plate 440 and the disc support 80 while being in surface contact therewith.

As described above, since the elastic support part 400 according to this embodiment supports the lower surface of the disc D, using not only the disc support 80, but also the support plate 440, it is possible to prevent the vibrations of the disc D due to a change in pressure between the disc D and the rotor case 22 by a rotational force during the rotations of the disc D.

Meanwhile, the case in which the support plate 440 protrudes from the edge of the frame 410 in the outer diameter direction is exemplarified in this embodiment; however, the present invention is not limited thereto. That is, the support plate 440 may be modified in various manners, if necessary, such as a case in which the support plate 440 protrudes from the elastic portion 420 or the claw 430 in the outer diameter direction.

Figure 9:
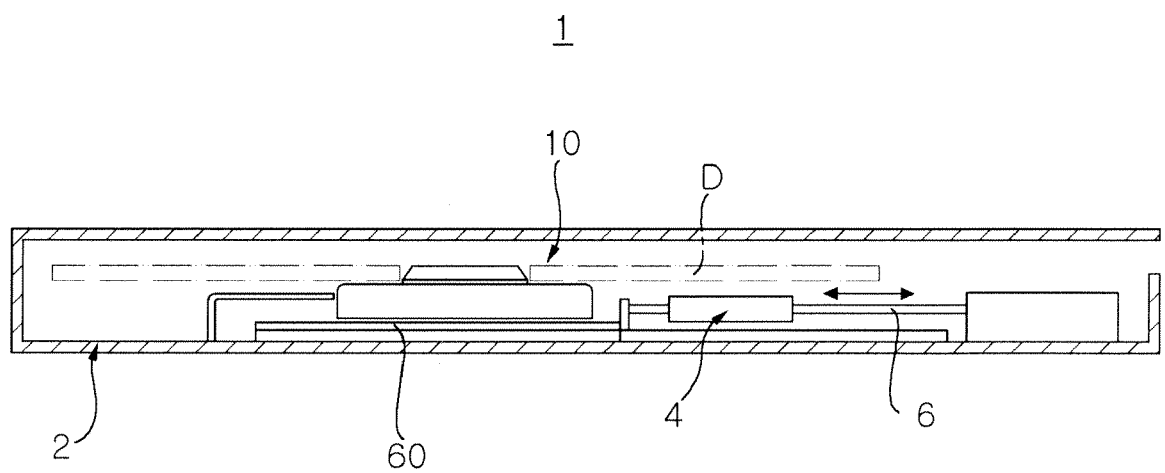
FIG. 9 is a schematic cross-sectional view of a disc driving device according to an embodiment of the present invention.

FIG. 9 is a schematic cross-sectional view of a disc driving device according to an embodiment of the present invention.

Referring to FIG. 9, a disc driving device 1 according to an embodiment of the present invention is equipped with the motor 10 according to the above-described embodiment shown in FIG. 1.

Further, the disc driving device 1 according to this embodiment may include a frame 2, an optical pickup unit 4, and a moving unit 6.

The frame 2 serves as a case for the disc driving device 1, and the base plate 60 of the motor 10 is fixed to the inside of the frame 2.

The optical pickup unit 4 is disposed to be movable under the disc D and receives data from the disc D.

The moving unit 6 moves the optical pickup unit 4 in the diameter direction of the disc D to receive data throughout the disc D.

In the disc chucking apparatus, the motor, and the disc driving device having the motor equipped therein, which have the configuration described above, the claws press horizontally the inner circumferential surface of the disc. Therefore, since the claws are not deformed, the inner circumferential surface of the disc may be supported by using the entirety of protruding surfaces of the claws and thus, it the disc may be stably supported as compared with the case of the related art.

Further, since the disc chucking apparatus according to the embodiments of the present invention supports the disc with several (e.g. six) claws, pressing forces may be distributed in several directions, as compared with the case of the related art. Therefore, it is possible to more stably support the disc and prevent the disc from being biased to any one side on the disc chucking apparatus when the disc is rotated.

Therefore, the centers of the disc and the centering base are aligned, such that the reliability of the disk in recording or playback thereof is improved.

Meanwhile, the disc chucking apparatus, the motor, and the disc driving device having the motor equipped therein, according to the above-described embodiments of the present invention are not limited to the embodiments and may be modified in various manners.

For example, the case in which the frame extends from the upper or lower surface of the centering base is exemplified in the embodiments described above; however, the present invention is not limited thereto. That is, it may be modified in various manners, if needed, such as cases in which the frame may extend from the middle portion of the outer circumference of the centering base in the outer diameter direction and may extend from the entirety of outer circumference of the centering base.

Further, the case in which the elastic portions are formed along the outer circumference of the centering base is exemplified in the embodiments described above; however, the present invention is not limited thereto. That is, they may be modified in different manners, such as a case in which the elastic portions protrude from the inside of the frame in the outer diameter direction, as long as they may allow the protrusions of the claws to be in contact with the inner circumferential surface of the disc and provide an elastic force to the claws.

Further, the disc chucking apparatus and the motor which are mounted on the disc driving device are exemplified in the embodiment of the present invention; however, the present invention is not limited thereto and may be freely used for various devices, as long as a disc with a circular through-hole or a groove is mounted and rotated by the devices.

As set forth above, in a disc chucking apparatus, a motor, and a disc driving device having the motor equipped therein according to embodiments of the present invention, claws press horizontally the inner circumferential surface of a disc. Therefore, since the claws are not deformed, the inner circumferential surface of the disc can be supported by using the entirety of protruding surfaces of the claws. Therefore, the disc can be stably supported as compared with the case of the related art.

Further, since the disc chucking apparatus supports the disc with several (e.g. six) claws, pressing force can be distributed in several directions, as compared with the case of the related art. Therefore, it is possible to more stably support the disc and prevent the disc from being biased to any one side on the disc chucking apparatus when the disc is rotated. Therefore, the centers of the disc and the centering base are aligned, whereby the reliability of the disk in recording or playback thereof can be improved.

While the present invention has been shown and described in connection with the exemplary embodiments, it will be apparent to those skilled in the art that modification and variation can be made without departing from the spirit and scope of the invention as defined by the appended claims.

What is claimed is:

1. A disc chucking apparatus comprising:
    a centering base to which an inner circumferential surface of a disc is fixed;
    a plurality of chuck chips arranged at regular intervals along an outer circumferential surface of the centering base; and
    a plurality of elastic support parts disposed to be opposite to the chuck chips on the centering base, rotating horizontally when the disc is mounted, and pressing the inner circumferential surface of the disc in an outer diameter direction thereof,
    wherein each of the elastic support parts comprises a frame protruding from the centering base in the outer diameter direction;
    an elastic portion extending from the frame along an outer circumference of the centering base; and
    a claw formed at an end of the elastic portion to be in contact with the inner circumferential surface of the disc,
    wherein the frame has a lower surface disposed on a plane different to that of a lower surface of the centering base.

2. The disc chucking apparatus of claim 1, wherein the elastic support parts are disposed within support indentations formed in the outer circumferential surface of the centering base.

3. The disc chucking apparatus of claim 1, wherein a circle formed by connecting ends of the frames of the elastic support parts corresponds to the outer circumference of the centering base.

4. The disc chucking apparatus of claim 1, wherein the frame has a lower surface extended horizontally from a lower surface of the centering base.

5. The disc chucking apparatus of claim 1, wherein the elastic portion protrudes bidirectionally from the frame along the outer circumference of the centering base.

6. The disc chucking apparatus of claim 5, wherein the elastic portion has a lower surface extended horizontally from a lower surface of the frame.

7. The disc chucking apparatus of claim 5, wherein the claw is formed at ends of the elastic portion protruding bidirectionally from the frame.

8. The disc chucking apparatus of claim 1, wherein the claw has a protrusion protruding from an outer surface thereof opposite to the inner circumferential surface of the disc and contacting the inner circumferential surface of the disc.

9. The disc chucking apparatus of claim 1, wherein a diameter of a circle formed by connecting contact surfaces between the claws and the inner circumferential surface of the disc is larger than a diameter of the centering base.

10. The disc chucking apparatus of claim 1, wherein the claw has an inclined surface at an upper portion of an outer surface thereof opposite to the inner circumferential surface of the disc.

11. The disc chucking apparatus of claim 10, wherein a diameter of a circle formed by connecting the uppermost ends of the inclined surfaces of the claws is smaller than a diameter of the centering base.

12. A motor comprising:
    the disc chucking apparatus of claim 1;
    a rotor having the disc chucking apparatus mounted thereon; and
    a stator rotating the rotor by electromagnetic coupling.

13. A disc driving device comprising:
    a motor having the disc chucking apparatus of claim 1;

an optical pickup unit optically recording or playing the disc; and a moving unit moving the optical pickup unit in a diameter direction of the disc.

14. A motor, comprising a disc chucking apparatus, the disc chucking apparatus comprising:

a centering base to which an inner circumferential surface of a disc is fixed;

a plurality of chuck chips arranged at regular intervals along an outer circumferential surface of the centering base; and a plurality of elastic support parts disposed to be opposite to the chuck chips on the centering base, rotating horizontally when the disc is mounted, and pressing the inner circumferential surface of the disc in an outer diameter direction thereof, wherein each of the elastic support parts comprises a frame protruding from the centering base in the outer diameter direction;

an elastic portion extending from the frame along an outer circumference of the centering base; and a claw formed at an end of the elastic portion to be in contact with the inner circumferential surface of the disc, wherein the elastic portion has a lower surface disposed on a plane different to that of a lower surface of the frame.

15. A motor, comprising a disc chucking apparatus, the disc chucking apparatus comprising:

a centering base to which an inner circumferential surface of a disc is fixed;

a plurality of chuck chips arranged at regular intervals along an outer circumferential surface of the centering base;

a plurality of elastic support parts disposed to be opposite to the chuck chips on the centering base, rotating horizontally when the disc is mounted, and pressing the inner circumferential surface of the disc in an outer diameter direction thereof, and a support plate protruding from each of the elastic support parts in the outer diameter direction and having an upper surface in surface contact with a lower surface of the disc.

16. The disc chucking apparatus of claim 15, wherein each of the elastic support parts comprises a frame protruding from the centering base in the outer diameter direction;

an elastic portion extending from the frame along an outer circumference of the centering base; and a claw formed at an end of the elastic portion to be in contact with the inner circumferential surface of the disc, wherein the support plate protrudes from an end of the frame.

* * * * *